Sept. 18, 1962  M. C. FIELDS ET AL  3,054,726
METHOD OF RECOVERING AMMONIA FROM AQUEOUS AMMONIA VAPORS
BY A TWO-STAGE STEAM DISTILLATION OPERATION
Filed Oct. 29, 1959
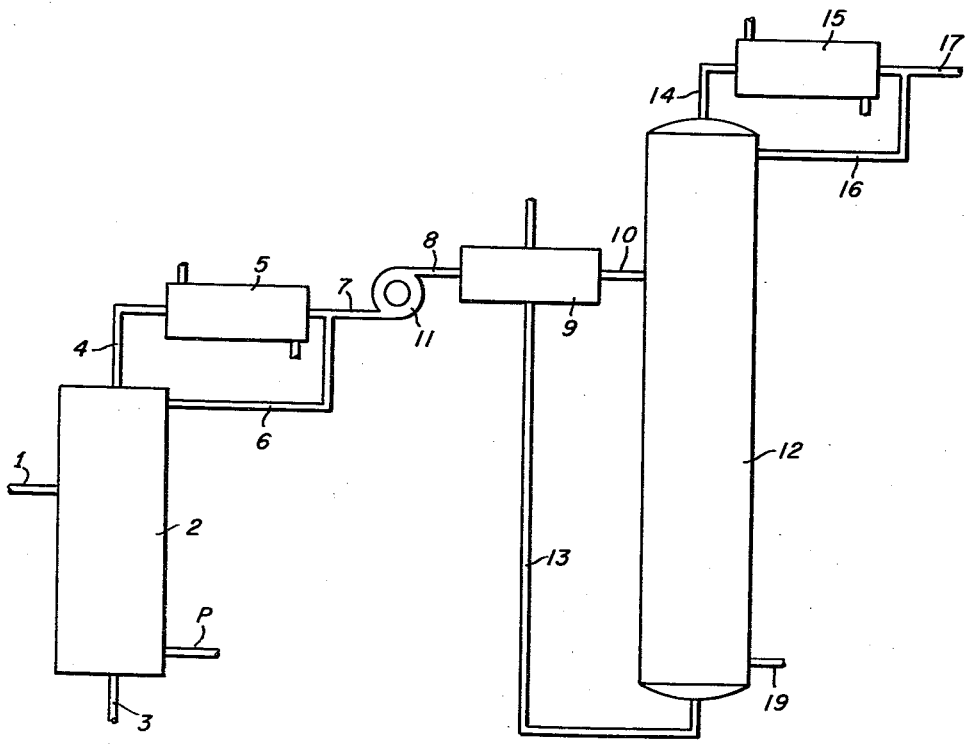
INVENTORS
MARVIN C. FIELDS and
ROBERT D. RICE
By Donald G. Dalton
Attorney United States Patent Office 3,054,726
Patented Sept. 18, 1962

3,054,726
METHOD OF RECOVERING AMMONIA FROM AQUEOUS AMMONIA VAPORS BY A TWO-STAGE STEAM DISTILLATION OPERATION
Marvin C. Fields, Wilkinsburg, and Robert D. Rice, Monroeville, Pa., assignors to United States Steel Corporation, a corporation of New Jersey
Filed Oct. 29, 1959, Ser. No. 849,573
3 Claims. (Cl. 202—46)

This invention relates to a method of producing ammonia of a high degree of purity from a mixture of ammonia and water vapor in which the ammonia concentration is relatively low, e.g., 20% or less.

Many processes in which anhydrous or highly concentrated ammonia is produced (either as a final product or as a stream to be recycled to an ammonia-consuming process), involve a lean $NH_3$-water vapor as an intermediate. The lean vapor (which we define as one containing less than about 25% $NH_3$) may be available at any pressure above or below atmospheric but is usually at a pressure too low to permit the condensation of the desired concentrated product with available cooling water. Fractionation of such a mixture may be effected either at the existing low pressure or after compression to a higher pressure. In the former case, refrigeration is necessary to condense the high-purity product. In the latter, the cost of power for the compression is usually prohibitive. It is usual, therefore, to condense the lean mixture of ammonia and water vapor and then fractionate the resulting liquid. This compromise, however, involves the loss of the latent heat of the starting mixture.

We have invented a method of fractionating a mixture of ammonia and water vapor of low concentration and pressure which avoids all the aforementioned objections. In a preferred practice we introduce a lean $NH_3$—$H_2O$ vapor into a fractionating tower operating at essentially the same pressure as the feed vapor, to produce an overhead $NH_3$—$H_2O$ vapor of the maximum concentration which can be totally condensed with available cooling water, in a practical manner. This column produces an essentially pure water bottoms. The steam for this tower can be introduced directly into the bottom of the tower. The $NH_3$—$H_2O$ overhead from this first tower is condensed, part is returned as reflux to aid in the rectification of the vapors in the upper part of the tower, and the balance is pumped into a tower operating under a pressure such that the $NH_3$—$H_2O$ product of the desired composition can be condensed with available cooling water. This high-pressure tower produces the final $NH_3$—$H_2O$ overhead of the desired composition, which is totally condensed and divided into product and reflux streams. The second tower also produces an essentially pure water bottoms at high temperature which is used to preheat the liquid feed entering the high-pressure tower. Since the bottoms from this second tower is essentially pure water, open steam may be used in this tower, as well as in the first.

A complete understanding of the invention may be obtained from the following detailed description and explanation which refer to the accompanying drawing, the single FIGURE of which is a diagrammatic showing of a system for practicing our method.

In the following description and explanation, we give a specific example of the invention, a practice for the production of one ton of liquid anhydrous ammonia per hour from a mixture of ammonia and water vapor at atmospheric presure containing 5% $NH_3$.

Referring to the drawing, saturated ammonia and water vapor feed at atmospheric pressure, containing 5% $NH_3$, is delivered through pipe 1 to tower 2. Tower 2 is a fractionating tower, operating at substantially atmospheric pressure, containing about four plates which may be bubble-cap, sieve or the like. The bottoms from this tower, taken off through pipe 3, consists of 15.5 tons per hour of essentially pure water (maximum $NH_3$ about 0.3%) at its boiling point. The overhead taken off through pipe 4 consists of a saturated $NH_3$—$H_2O$ vapor containing 20% $NH_3$. The steam supply for this tower introduced through pipe P consists of 1000 pounds per hour of saturated steam at approximately one atmosphere, which is charged directly into the bottom of the column.

The overhead vapor passes through pipe 4 to a condenser 5 where it is totally condensed with 85° F. cooling water. The solution leaving the condenser 5 is divided and a portion taken through pipe 6 is refluxed to the top of tower 2. The remainder proceeds through pipe 7 and its pressure is raised by means of pump 11 to approximately 200 p.s.i.g. The discharge pipe 8 from the pump carries five tons per hour of a 20% $NH_3$—$H_2O$ solution at 120° F. and 200 p.s.i.g. to heat exchanger 9 where it is heated to 288° F., its saturation temperature at 200 p.s.i.g. Pipe 10 conducts the hot solution leaving heat exchanger 9 to a tower 12. Tower 12 is a fractionating tower operating at 200 p.s.i.g., containing about 15 plates which may be bubble-cap, sieve or the like. The bottoms from this tower consists of six tons per hour of substantially pure water (maximum $NH_3$ about 0.5%) at 388° F., which flows through pipe 13 to heat exchanger 9.

The overhead from column 12, taken off through pipe 14 is a saturated anhydrous ammonia vapor (99.7% $NH_3$). It is passed through a condenser 15 where it is totally condensed with 85° F. cooling water. The solution leaving condenser 15 is divided and a portion taken through pipe 16 is refluxed to the top of the tower 12. The product flowing through pipe 17 consists of one ton per hour of the desired liquid anhydrous ammonia. The steam requirement for tower 12 consists of 4000 pounds per hour of saturated steam at approximately 200 p.s.i.g. It is fed directly into the bottom of the column through pipe 19.

For the example given above, the total steam consumption required for the separation is 5000 pounds per hour. If the fractionation had been conducted in the normal manner (i.e., if the 5% $NH_3$ vapor feed had been totally condensed and then pumped into a single high-pressure tower to produce the liquid anhydrous ammonia) a steam consumption of 10,000 pounds per hour would have been required for the separation. Since steam is normally the greatest single expense incurred in fractionating ammonia-water feeds, it is evident that our process presents a very substantial economic advantage.

Our invention utilizes the latent heat contained in the vapor feed and therefore effects important steam savings where it is desired to fractionate a lean $NH_3$—$H_2O$ vapor feed available at atmospheric pressure. In this process, optimum results will be obtained by always operating the first tower at a pressure essentially equal to the pressure of the incoming vapor irrespective of the availability of high-pressure steam. It will be recognized, however, that even if the feed vapor is available at a pressure somewhat above atmospheric, it may be desirable for reasons of simplicity to operate the first fractionator at atmospheric pressure. The steam supply for both towers can be introduced directly into the bottoms of the towers, thus eliminating any need for closed reboilers.

Although we have disclosed herein the preferred practice of our invention, we intend to cover as well any change or modification therein which may be made without departing from the spirit and scope of the invention.

We claim:
1. In a method of recovering ammonia from a mixture of the vapor thereof with water vapor, said mixture being available at a pressure lower than that which will permit condensation of the desired ammonia product with available cooling water, the steps of introducing said vapor mixture into a fractionating tower operated at substantially the same pressure, admitting steam to the base of said tower and withdrawing water therefrom, condensing with available cooling water the overhead vapors from said fractionating tower, said overhead vapors having substantially the maximum ammonia concentration that can be condensed at the said pressure with available cooling water, refluxing a portion of the condensate and pumping the remainder of the condensate into a second fractionating tower operated at a substantially higher pressure such that the desired ammonia product is condensible with available cooling water, admitting steam to the base of said second tower, and withdrawing ammonia-free water therefrom, condensing the overhead vapor from said second tower with available cooling water, refluxing a portion of the condensate and withdrawing the remainder of the condensate as the desired ammonia product.

2. A method as defined in claim 1, characterized by said predetermined pressure being about atmospheric pressure.

3. A method as defined in claim 1, characterized by effecting an exchange of heat between the bottoms from said second tower and said condensate.

References Cited in the file of this patent
UNITED STATES PATENTS

| | | |
|---|---|---|
| 2,108,914 | Bennett | Feb. 22, 1938 |
| 2,501,326 | Gilmore | Mar. 21, 1950 |
| 2,509,136 | Cornell | May 23, 1950 |
| 2,519,451 | Fulton | Aug. 22, 1950 |
| 2,805,984 | St. Clair | Sept. 10, 1957 |
| 2,935,451 | Troyan | May 3, 1960 |